(12) United States Patent
Kenyon et al.

(10) Patent No.: US 8,899,010 B2
(45) Date of Patent: Dec. 2, 2014

(54) PULSE DETONATION COMBUSTOR

(75) Inventors: Ross Hartley Kenyon, Waterford, NY (US); Adam Rasheed, Glenville, NY (US); Paul Whitson Dom, Jr., Hamilton, OH (US); Mark Joseph Pombles, Highland Heights, KY (US)

(73) Assignee: General Electric Company, Niskayuna, NY (US)

( * ) Notice: Subject to any disclaimer, the term of this patent is extended or adjusted under 35 U.S.C. 154(b) by 988 days.

(21) Appl. No.: 12/948,181

(22) Filed: Nov. 17, 2010

(65) Prior Publication Data
US 2012/0122039 A1    May 17, 2012

(51) Int. Cl.
| | | |
|---|---|---|
| F02C 5/00 | (2006.01) | |
| F02C 7/20 | (2006.01) | |
| F23R 7/00 | (2006.01) | |
| F02C 5/02 | (2006.01) | |

(52) U.S. Cl.
CPC ............... *F23R 7/00* (2013.01); *F23D 2211/00* (2013.01); *F05D 2260/16* (2013.01); *F02C 5/02* (2013.01)
USPC ............. 60/39.38; 60/39.76; 60/247; 60/796; 60/797; 60/799; 431/1

(58) Field of Classification Search
CPC .............. F02C 5/00; F02C 5/02; F01D 9/023; F23R 3/002; F23R 7/00; F02K 7/02
USPC ......... 60/39.38, 39.39, 39.4, 39.76, 247, 796, 60/797, 799; 431/1
See application file for complete search history.

(56) References Cited

U.S. PATENT DOCUMENTS

| | | | | |
|---|---|---|---|---|
| 4,767,313 | A * | 8/1988 | Lockwood, Jr. ................... | 431/1 |
| 6,450,762 | B1 * | 9/2002 | Munshi ......................... | 415/138 |
| 6,834,507 | B2 * | 12/2004 | Jorgensen ........................ | 60/800 |
| 6,886,325 | B2 * | 5/2005 | Norris et al. .................. | 60/39.34 |
| 2006/0254252 | A1 * | 11/2006 | Rasheed et al. .............. | 60/39.38 |
| 2009/0266047 | A1 | 10/2009 | Kenyon et al. | |

OTHER PUBLICATIONS

Ross Hartley Kenyon et al.; "Pulse Detonation Combustor"; U.S. Appl. No. 12/627,942, filed Nov. 30, 2009; 32 Pages.

* cited by examiner

*Primary Examiner* — Phutthiwat Wongwian
*Assistant Examiner* — Steven Sutherland
(74) *Attorney, Agent, or Firm* — John P. Darling

(57) ABSTRACT

A pulse detonation combustor including a plurality of nozzles engaged with one another via mating surfaces to support a gas discharge annulus in a circumferential direction. The pulse detonation combustor also including multiple pulse detonation tubes extending for the nozzles and a plurality of thermal expansion control joints coupled to the plurality of pulse detonation tubes. Each of the plurality of thermal expansion control joints is configured to facilitate independent thermal growth of each of the plurality of pulse detonation tubes. The thermal expansion control joints may be configured as a bellows expansion joint or a sliding expansion joint.

27 Claims, 4 Drawing Sheets

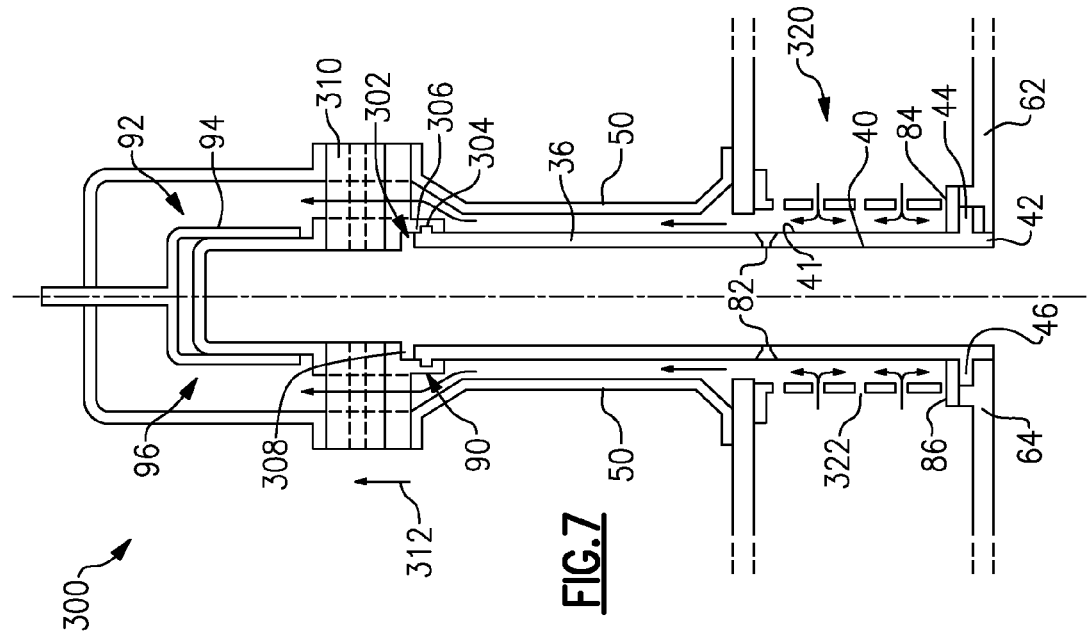
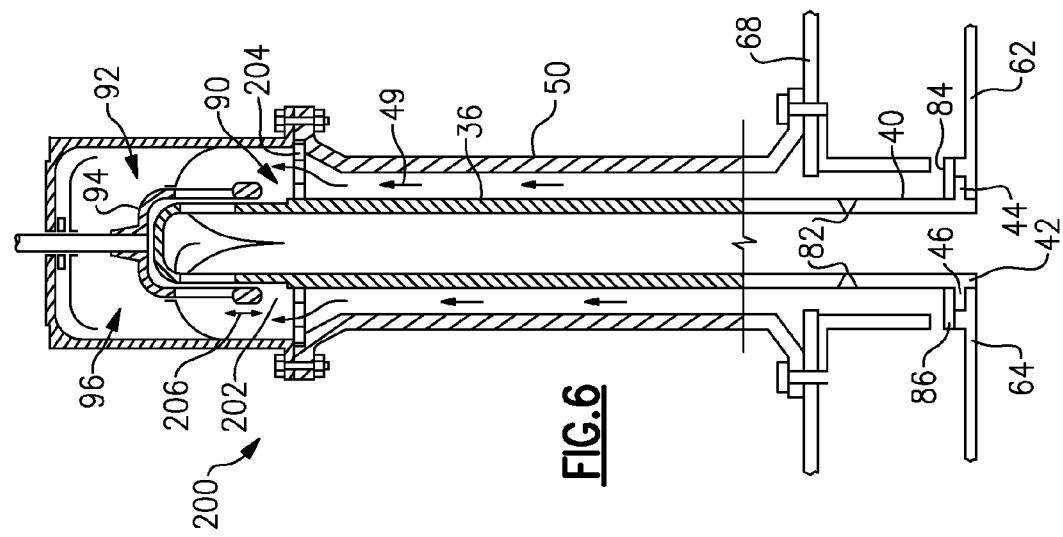

PULSE DETONATION COMBUSTOR

BACKGROUND

The subject matter disclosed herein relates to a pulse detonation combustor, and, more specifically, to an arrangement of pulse detonation tubes within a pulse detonation combustor that accommodates thermal growth of the pulse detonation tubes.

Gas turbine engines include one or more combustors, which receive and combust compressed air and fuel to produce hot combustion gases. Certain turbine engine concepts employ a pulse detonation combustor that includes one or more pulse detonation tubes configured to combust the fuel-air mixture using a detonation reaction. Within a pulse detonation tube, the combustion reaction is driven by a detonation wave that moves at supersonic speed, thereby increasing the efficiency of the combustion process. Specifically, air and fuel are typically injected into the pulse detonation tube in discrete pulses. The fuel-air mixture is then detonated by an ignition source, thereby establishing a detonation wave that propagates through the tube at a supersonic velocity. The detonation process produces pressurized exhaust gas within the pulse detonation tube that ultimately drives a turbine to rotate.

Unfortunately, due to the high temperatures and pressures associated with detonation reactions, longevity of the pulse detonation tubes and associated components may be significantly limited. Specifically, nozzles that direct exhaust gas from the pulse detonation tubes to the turbine inlet may experience high thermal stress, thereby limiting the useful life of such nozzles. In addition, thermal expansion of the pulse detonation tubes requires complex mounting and sealing configurations to maintain an entrance angle of exhaust gas into the turbine and efficiency of the turbine engine.

Therefore, there is a need for a new and improved pulse detonation combustor that addresses the high temperatures and pressures associated with detonation reactions and the resulting complex mounting and sealing configurations that facilitate thermal growth of the pulse detonation tube.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

Briefly, in accordance with one embodiment, a pulse detonation combustor is provided. The pulse detonation combustor includes a plurality of nozzles configured to support a gas discharge annulus in a circumferential direction; a plurality of pulse detonation tubes extending to the plurality of nozzles; and a plurality of thermal expansion control joints configured to facilitate independent thermal growth of each pulse detonation tube.

In accordance with another embodiment, a pulse detonation combustor is provided. The pulse detonation combustor includes a plurality of nozzles each having a nozzle exit orifice and a nozzle inlet, wherein the plurality of nozzle orifices are configured to form a gas discharge annulus. The combustor further includes a plurality of pulse detonation tubes each coupled to a respective nozzle inlet; and a plurality of thermal expansion control configured to facilitate independent thermal growth of each pulse detonation tube.

These and other advantages and features will be better understood from the following detailed description of preferred embodiments of the invention that is provided in connection with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is a cross-sectional view of a pulse detonation combustor having thermal expansion control joints in accordance with certain embodiments of the present disclosure; and FIG. 7 is a cross-sectional view of a pulse detonation combustor having thermal expansion control joints in accordance with certain embodiments of the present disclosure.

DETAILED DESCRIPTION

Figure 1:
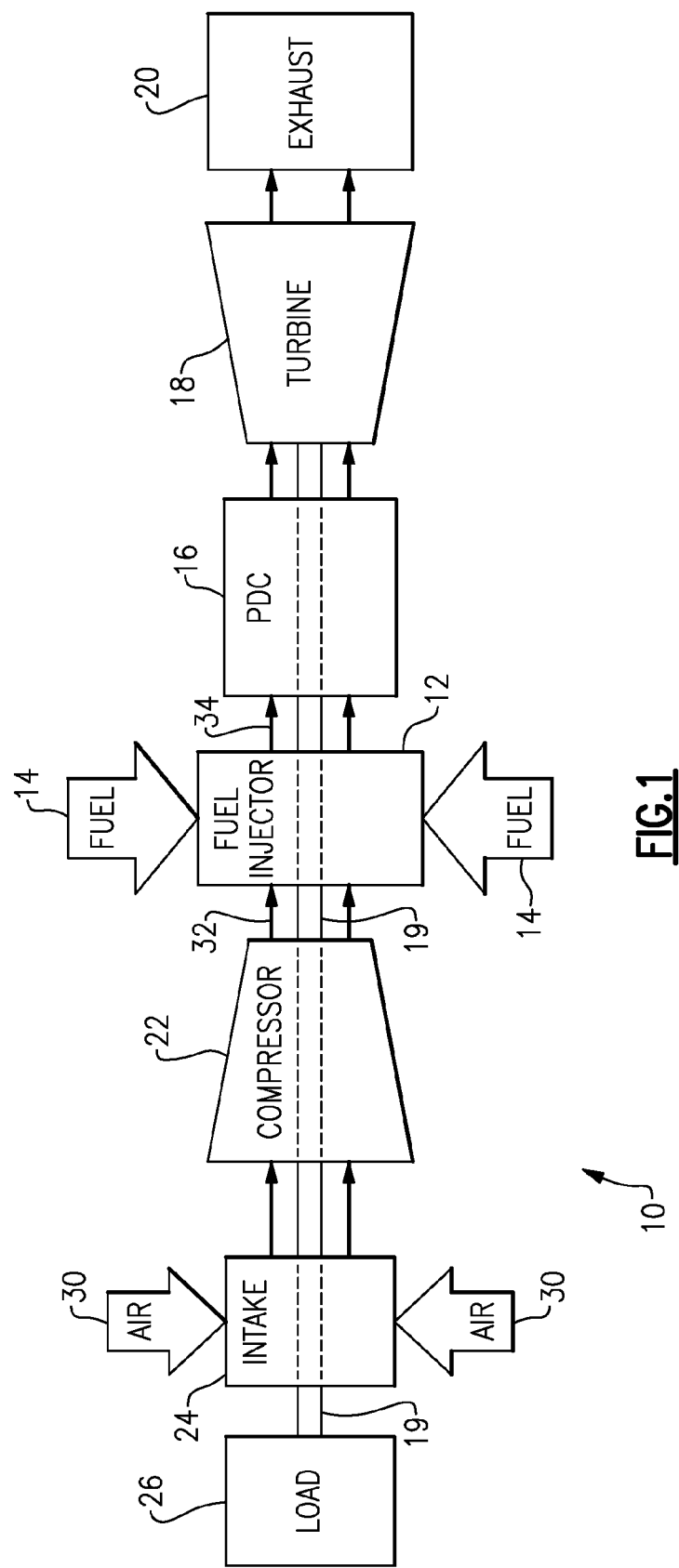
FIG. 1 is a block diagram of a turbine system having a pulse detonation combustor including a pulse detonation tube and multiple nozzles configured to interlock and provide for thermal growth of a pulse detonation tube in accordance with certain embodiments of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure may increase the longevity of pulse detonation combustors, and in particular the pulse detonation tubes, by providing for thermal growth of the pulse detonation tubes during operation. Specifically, in certain embodiments, a pulse detonation combustor includes multiple pulse detonation tubes, each being coupled to a nozzle. Each of the multiple nozzles including a nozzle exit orifice and a nozzle inlet. The pulse detonation tube is coupled to each nozzle inlet, and configured to flow exhaust gas from a detonation reaction through the nozzle. Furthermore, the pulse detonation tubes, each includes at least one thermal expansion control joint that provides for mounting of the pulse detonation tube to its respective nozzle to facilitate thermal growth of the pulse detonation tube during operation.

Certain embodiments may also employ an impingement cooling system configured to provide a cooling flow to the pulse detonation tube, thereby reducing temperature and thermal stress. Specifically, an impingement cooling system may include multiple axial cooling slots in flow communication with each pulse detonation tube. Such a cooling system may significantly reduce the temperature of the pulse detonation tube and minimize thermal growth.

As used herein, a pulse detonation tube is understood to mean any device or system that produces both a pressure rise and velocity increase from a series of repeated detonations or quasi-detonations within the tube. A "quasi-detonation" is a supersonic turbulent combustion process that produces a pressure rise and velocity increase higher than the pressure rise and velocity increase produced by a deflagration wave. Embodiments of pulse detonation tubes include a means of igniting a fuel/oxidizer mixture, for example a fuel/air mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, auto ignition or by another detonation (i.e. cross-fire).

The geometry of the detonation combustor is such that the pressure rise of the detonation wave expels combustion products out the pulse detonation combustor exhaust to produce a thrust force. Pulse detonation combustion can be accomplished in a number of types of combustion chambers, including shock tubes, resonating detonation cavities and tubular/tuboannular/annular combustors. As used herein, the term "chamber" includes pipes having circular or non-circular cross-sections with constant or varying cross sectional area. Exemplary chambers include cylindrical tubes, as well as tubes having polygonal cross-sections, for example hexagonal tubes.

Turning now to the drawings and referring first to FIG. 1, a block diagram of an embodiment of a gas turbine system 10 is illustrated. The turbine system 10 includes a fuel injector 12, a fuel supply 14, and a pulse detonation combustor (PDC) 16. As illustrated, the fuel supply 14 routes a liquid fuel and/or gaseous fuel, such as natural gas, to the turbine system 10 through the fuel injector 12 into the PDC 16. As discussed below, the fuel injector 12 is configured to inject and mix the fuel with compressed air. The PDC 16 ignites and combusts the fuel-air mixture, and then passes hot pressurized exhaust gas into a turbine 18. The exhaust gas passes through turbine blades in the turbine 18, thereby driving the turbine 18 to rotate. Coupling between blades in the turbine 18 and a shaft 19 will cause the rotation of the shaft 19, which is also coupled to several components throughout the turbine system 10, as illustrated. Eventually, the exhaust of the combustion process may exit the turbine system 10 via an exhaust outlet 20.

In an embodiment of the turbine system 10, compressor blades are included as components of a compressor 22. Blades within the compressor 22 may be coupled to the shaft 19, and will rotate as the shaft 19 is driven to rotate by the turbine 18. The compressor 22 may intake air to the turbine system 10 via an air intake 24. Further, the shaft 19 may be coupled to a load 26, which may be powered via rotation of the shaft 19. As will be appreciated, the load 26 may be any suitable device that may use the power of the rotational output of the turbine system 10, such as an electrical generator or an external mechanical load. For example, the load 26 may include an electrical generator, a propeller of an airplane, and so forth. The air intake 24 draws air 30 into the turbine system 10 via a suitable mechanism, such as a cold air intake. The air 30 then flows through blades of the compressor 22, which provides compressed air 32 to the PDC 16. In particular, the fuel injector 12 may inject the compressed air 32 and fuel 14, as a fuel-air mixture 34, into the PDC 16. Alternatively, the compressed air 32 and fuel 14 may be injected directly into the PDC 16 for mixing and combustion.

As discussed in detail below, the present embodiment includes multiple pulse detonation tubes within the PDC 16. The tubes are configured to receive compressed air 32 and fuel 14 in discrete pulses. After a pulse detonation tube has been loaded with a fuel-air mixture, the mixture is detonated by an ignition source, thereby establishing a detonation wave that propagates through the tube at a supersonic velocity. The detonation process produces pressurized exhaust gas within the pulse detonation tube that ultimately drives the turbine 18 to rotate. In certain embodiments, each pulse detonation tube is coupled to the turbine 18 via a nozzle including a nozzle exit orifice. The nozzle exit orifices engage with one another via mating surfaces(28) to form a gas discharge annulus. This configuration provides mutual support for each nozzle exit orifice, thereby facilitating resistance to thermal loads associated with the hot exhaust gas. Alternatively, the nozzles for each tube may be integrally formed out of a single monolith, such as a casting or a single machined block of metal. Further embodiments may employ a cooling system to reduce the temperature of the pulse detonation tube, thereby increasing longevity of the combustor. While the pulse detonation tubes are described with reference to a PDC 16, it should be appreciated that the presently disclosed embodiments may be utilized for other applications employing pulse detonation tubes.

Figure 2:
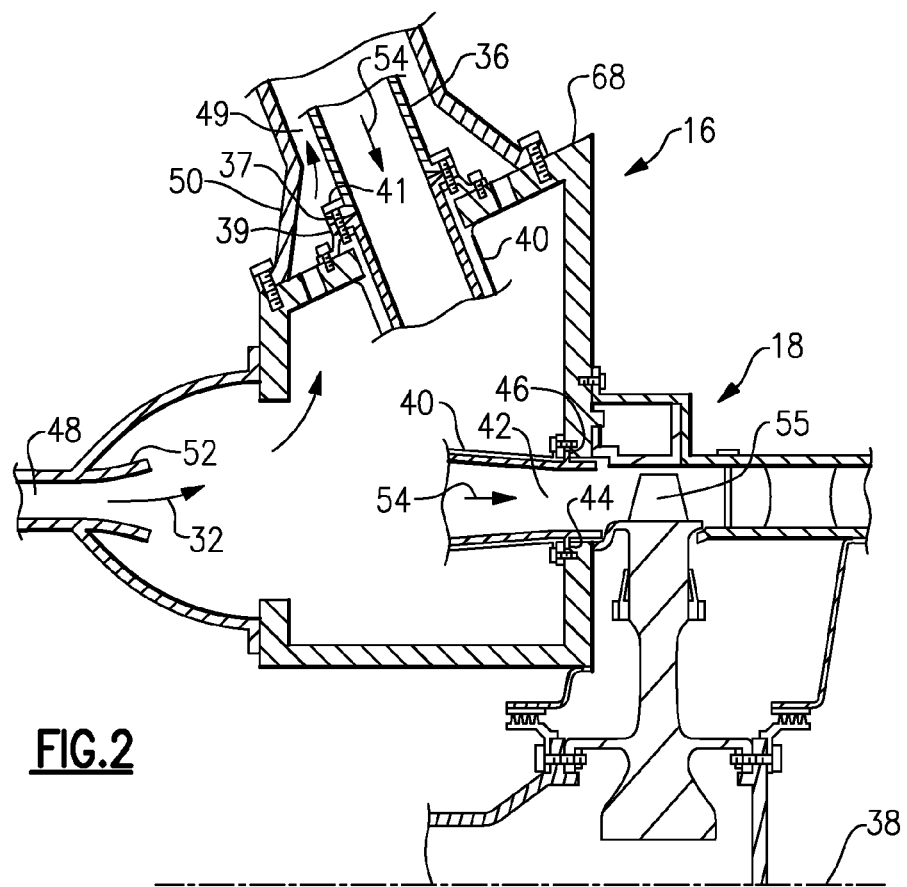
FIG. 2 is a partial cross-sectional side view of the pulse detonation combustor, as shown in FIG. 1, in accordance with certain embodiments of the present disclosure.

FIG. 2 is a partial cross-sectional side view of the PDC 16 that may be used in the turbine system 10 of FIG. 1. As previously discussed, the PDC 16 includes multiple pulse detonation tubes (PDTs) 36. While only one PDT 36 is illustrated, it will be appreciated that multiple PDTs 36 may be circumferentially positioned about a centerline 38. Generally, PDCs 16 include PDTs 36 oriented axially and radially away from the turbine 18, thus increasing the length of the turbine system 10 compared to traditional configurations employing deflagration-type combustors. As discussed in detail below, a circumferential arrangement of PDTs 36 may decrease the overall length of the turbine system 10 to a length more commensurate in scope with traditional turbine systems. While a PDC 16 is employed in the present configuration, it should be noted that alternative embodiments may employ a combustor including both PDTs 36 and traditional deflagration-type combustors.

As illustrated, each PDT 36 is coupled to a respective nozzle 40. In alternative embodiments, multiple PDTs 36 may be coupled to each nozzle 40. In the present embodiment, each PDT 36 may include a flange 37 configured to mate with a corresponding flange 39 of the nozzle 40. As illustrated, fasteners 41 serve to secure the PDT flange 37 to the nozzle flange 39. Further embodiments may employ alternative conventional means of attaching the PDT 36 to the nozzle 40 (e.g., welded connection). Additionally, the nozzle 40 may be integral with the PDT 36. That is, the PDT 36 and nozzle 40 may be combined into a single structure. As will be described in greater detail below, each nozzle 40 comprises a nozzle exit orifice 42 having an inner flanged segment 44 and an outer flanged segment 46. In certain embodiments, the nozzle exit orifices 42 contain unique features that allow them to be interlocked, thereby establishing a combined gas discharge annulus that provides mutual support for the individual nozzles 40, as well as a surface for mounting to a frame. In other embodiments, the nozzles for each tube could be formed from a single integral structure.

In operation, pressurized air 32 enters the PDC 16 through a compressor outlet 48, including a diffuser 52 that directs airflow into the PDC 16. Specifically, the diffuser 52 converts the dynamic head from high-velocity compressor air into a pressure head suitable for combustion (i.e., decreases flow velocity and increases flow pressure). In the present embodiment, the flow is redirected such that turbulence is substantially reduced.

The pressurized air 32 is then directed into a flow path 49 between a PDC casing 50 and the PDT 36. As illustrated, PDC casing 50 is coupled to a structural member 68 providing support to PDC casing 50. As previously discussed, detonation reactions generate significant heat output. Because the pressured air 32 is cooler than the detonation reaction within the PDT 36, airflow along the outer wall of the PDT 36 transfers heat from the PDT 36 to the pressurized air 32. This configuration both cools the PDT 36 during operation, and increases the temperature of air entering the PDT 36.

The pressured air 32 ultimately flows to a distal end (not shown) of the PDT 36 prior to entering an interior of the PDT 36. As the pressurized air 32 reaches the distal end, an air valve periodically opens to emanate air pulses into the PDT 36. In addition, the fuel injector 12 injects fuel into the air stream, either prior to entering the PDT 36, or within the PDT 36, thereby establishing a fuel-air mixture 34 suitable for detonation. Within the PDT 36, the fuel-air mixture 34 is detonated by an ignition source, establishing a deflagration to detonation transition (DDT) that forms a detonation wave. The detonation wave propagates through the fuel-air mixture toward the nozzle 40 at a supersonic velocity. The detonation wave induces a combustion reaction between the fuel and air, thereby generating heat and forming exhaust products 54 upstream of the wave. As the detonation wave propagates through the fuel-air mixture, the interior of the PDT 36 becomes pressurized due to temporary confinement of the expanding exhaust products 54 within the PDT 36. Specifically, the detonation wave heats the exhaust products 54 faster than the expanding gas can exit the nozzle 40, thereby increasing pressure within the PDT 36. After the detonation wave has substantially reacted the fuel and air within the PDT 36, the pressurized exhaust products 54 are expelled through the nozzle 40 into a turbine rotor 55, thereby driving the turbine 18 to rotate.

The nozzle 40 converges in a cross-sectional area perpendicular to a direction of gas flow through the nozzle to maintain a choked flow of the exhaust products 54 from the PDT 36 to the nozzle exit orifice 42. For example, in certain configurations, the cross-sectional area of the PDT 36 may be approximately four times greater than a cross-sectional area of the nozzle exit orifice 42. In addition, each nozzle may converge in cross-sectional area from the nozzle inlet to a throat, and diverge in cross-sectional area from the throat to the nozzle exit orifice 42. Furthermore, the nozzle 40 may transition from a substantially circular cross-section of the PDT 36 to a shape having substantially flat circumferential sides at the nozzle exit orifice 42. The substantially flat circumferential sides may enable the nozzle exit orifices 42 to interlock, thereby forming a gas discharge annulus that supports the nozzle exit orifices 42 during operation. As will also be described, the PDT 36 and nozzle 40 may be oriented at an angle with respect to the turbine system centerline 38 that is at or near a turbine entrance angle. The exhaust products 54 are thereby directed to the turbine 18 at a suitable orientation to obviate first stage turbine nozzles.

Figure 3:
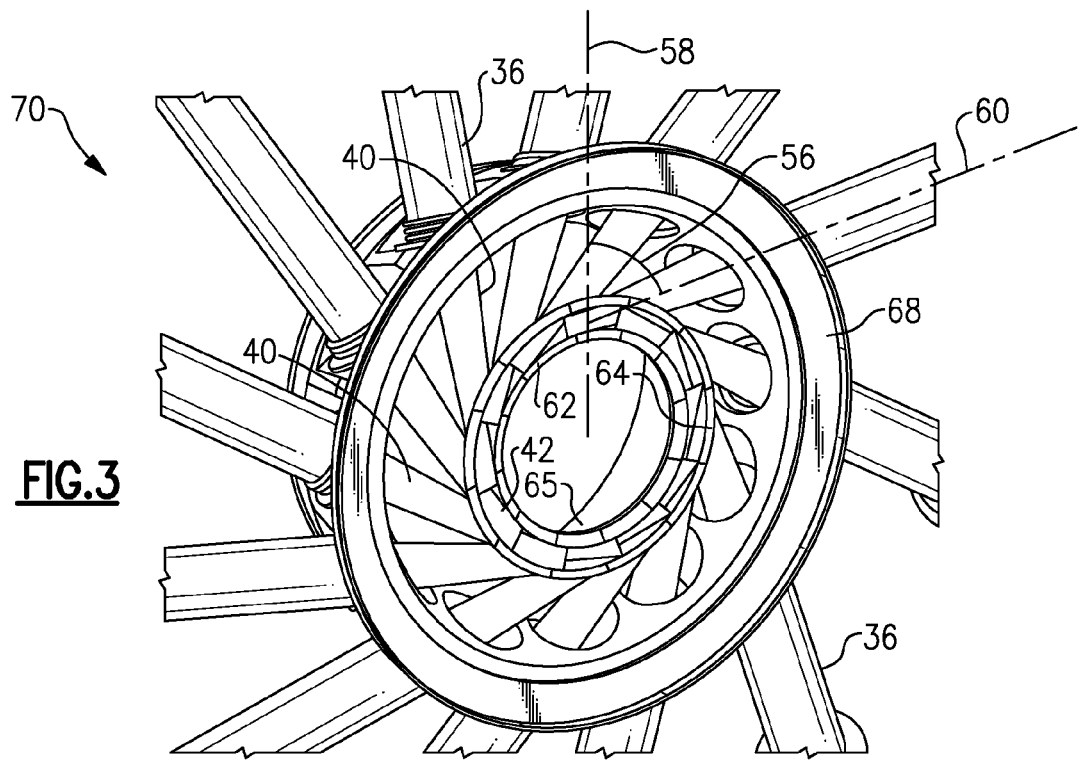
FIG. 3 is a perspective view of the pulse detonation combustor of FIG. 1, showing a pulse detonation tube and nozzle assembly, in accordance with certain embodiments of the present disclosure.

FIG. 3 is a perspective view of an exemplary pulse detonation combustor, and more particularly a tube and nozzle assembly 70, looking generally from the turbine 18 toward the compressor 22. As discussed in detail below, the nozzle exit orifices 42 are designed to tessellate and interlock with adjoining nozzle exit orifices 42 when assembled into a gas discharge annulus 65. This configuration may provide structural support for each nozzle exit orifice 42, thereby protecting the orifices 42 from high thermal and mechanical stresses associated with the detonation process.

In the present configuration, the nozzles 40, and as a result the PDTs 36, are oriented at an angle 56 with respect to a radial axis 58 extending from the turbine system centerline 38. Specifically, the angle 56 defines the angular orientation of a nozzle centerline 60 relative to the radial axis 58. In other words, the nozzles 40 are oriented substantially tangent to the gas discharge annulus 65 formed by the assembly of nozzle exit orifices 42. In alternative embodiments, the nozzles 40 may be oriented at other suitable angles 56 relative to the radial axis 58. For example, angle 56 may be approximately between 0 to 180, 30 to 150, 60 to 120, 60 to 90, or about 75 to 90 degrees. The orientation of the nozzles 40 imparts a circumferential velocity component onto the flow of exhaust products into the turbine 18.

Furthermore, while twelve nozzles 40 are coupled to the PDC 16 in the depicted embodiment, alternative embodiments may employ more or fewer nozzles 40. For example, certain PDC configurations may include more than 1, 2, 4, 6, 8, 10, 12, 14, 16, 18, 20, or more nozzles 40 and associated PDTs 36. Each nozzle exit orifice 42 includes the inner flange segment 44 and the outer flange segment 46 which, when assembled, form inner and outer flanges about the gas discharge annulus 65. The inner flange provides a surface against which the inner frame member 62 may be mounted, and the outer flange provides a surface against which an outer frame member 64 may be secured. Both the inner and outer frame members 62 and 64 are secured to the turbine 18. In addition, a structural member 68 is illustrated and provides structural support to secure the nozzles 40 to the PDC 16 such that thermal expansion of the nozzles 40 and/or the PDTs 36 does not significantly alter the position and orientation of the nozzle exit orifices 42 relative to the turbine 18. In this configuration, nozzle exit orifices 42 may flow exhaust products 54 into the turbine 18 at an orientation configured to obviate first stage turbine nozzles. Additional information regarding a pulse detonation combustor configuration, including a plurality of pulse detonation tubes coupled to a plurality of nozzles, in which a plurality of nozzle exit orifices are engaged with one another via mating surfaces can be found in co-pending U.S. Patent application entitled, "Pulse Detonation Combustor" by Kenyon et al., filed on Nov. 30, 2009, bearing Ser. No. 12/627,942 and assigned to the same assignee, which application is incorporated herein by this reference.

Figure 5:
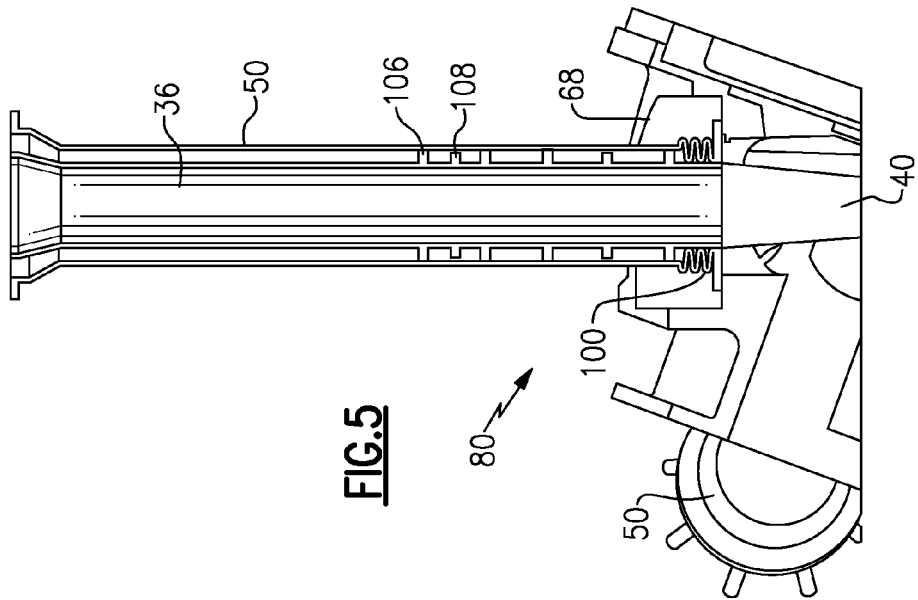
FIG. 5 is an enlarged cut-away perspective side view of the pulse detonation combustor, as shown in FIG. 4, having thermal expansion control joints in accordance with certain embodiments of the present disclosure.
Figure 4:
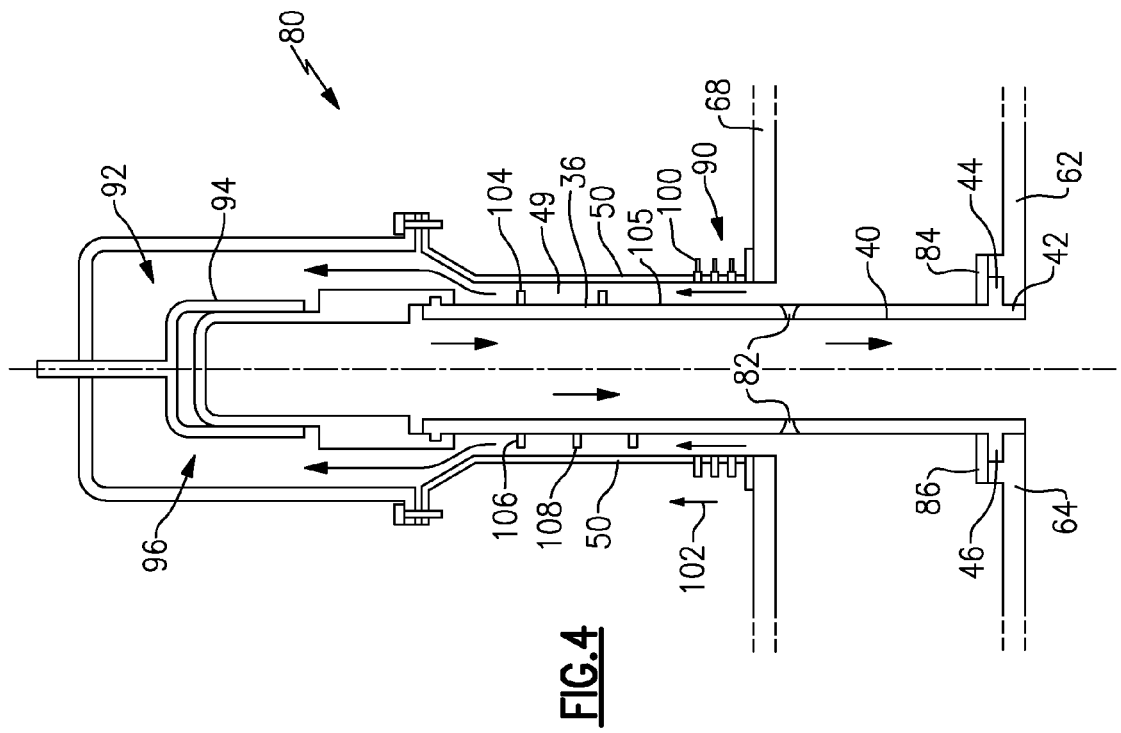
FIG. 4 is a cross-sectional view of a pulse detonation combustor in accordance with certain embodiments of the present disclosure.

Referring now to FIGS. 4 and 5, illustrated in a cross-sectional view and partial cross-sectional view, respectively, is a pulse detonation combustor, and more particularly a pulse detonation tube and nozzle assembly, 80 including a thermal expansion control joint configured to enable the pulse detonation tube 36 to thermally expand during operation. As previously discussed, the PDT 36 may be coupled to the nozzle 40 using a variety of techniques. As illustrated, the PDT 36 and nozzle 40 are attached via a welded joint 82. As will be appreciated, the detonation process generates heat that may induce significant thermal expansion of the PDTs 36. For example, a 40 inch (102 cm) long PDT may increase in length by as much as 0.75 inches (2 cm). As illustrated, the nozzle exit orifice 42 is secured to the inner frame member 62 by the inner flange segment 44, which is sandwiched between the inner frame member 62 and an inner support member 84. Similarly, the outer flange segment 46 is sandwiched between the outer frame member 64 and an outer support member 86, thereby securing the nozzle exit orifice 42 to the outer frame member 64. Because the inner frame member 62 and the outer frame member 64 are secured to the turbine 18, the position of the nozzle exit orifice 42 is fixed with respect to the turbine 18. This configuration maintains the orientation of exhaust flow into the turbine 18 despite thermal growth of the nozzle 42 and/or the PDT 36. In the exemplary embodiment, the PDC casing 50 is coupled to the structural member 68 and includes a thermal expansion control joint 90 to facilitate thermal expansion, or growth, of the PDT 36 while maintaining a position of a tube head end 92 with respect to the casing 50, and more specifically an outer cup 94 of an air valve 96 that periodically opens to emanate air pulses into the PDT 36. More particularly, thermal expansion control joint 90 is configured as a bellows expansion joint 100 integrally formed with the PDC casing 50 whereby, during thermal growth of the PDT 36, the bellows expansion joint 100 expands in an axial direction as indicated by arrows 102. A plurality of alignment fins 104 may be provided extending from an outer surface 105 of the PDT 36 to maintain concentric alignment of the PDT 36 relative to the PDC casing 50 during thermal expansion of the PDT 36. Alignment fins 104 may be formed as a ring 106 circumscribing the PDT 36, or alternatively, as a plurality of discrete pin-type protrusions 108 providing for a greater free flow of air through the flow path 49 between the PDC casing 50 and the PDT 36. By incorporating a thermal expansion control joint 90 for each pulse detonation combustor, and more particularly each pulse detonation tube and nozzle assembly, 80 each individual PDTs 36 is configured to expand independently of the other PDTs 36.

Referring now to FIG. 6, illustrated in a cross-sectional view is a pulse detonation combustor, and more particularly a pulse detonation tube and nozzle assembly, 200 including a thermal expansion control joint configured to enable the pulse detonation tube 36 to thermally expand during operation. As previously discussed, the PDT 36 may be coupled to the nozzle 40 using a variety of techniques. As illustrated, the PDT 36 and nozzle 40 are attached via a welded joint 82. As previously described with regard to FIGS. 4 and 5, the detonation process generates heat that may induce significant thermal expansion of the PDTs 36. Similar to the previous embodiment, the nozzle exit orifice 42 is secured to the inner frame member 62 by the inner flange segment 44, which is sandwiched between the inner frame member 62 and the inner support member 84. Similarly, the outer flange segment 46 is sandwiched between the outer frame member 64 and the outer support member 86, thereby securing the nozzle exit orifice 42 to the outer frame member 64. The position of the nozzle exit orifice 42 is fixed with respect to the turbine 18, thus maintaining the orientation of exhaust flow into the turbine 18 despite thermal growth of the nozzle 42 and/or the PDT 36. In this exemplary embodiment, the PDC casing 50 is coupled to the structural member 68 and includes the thermal expansion control joint 90 to facilitate thermal expansion, or growth, of the PDT 36 while maintaining a position of the tube head end 92 with respect to the casing 50. In the embodiment illustrated in FIG. 6, the thermal expansion control joint 90 is configured as an expansion joint 202 between a lower end of the outer cup 94 of the aid valve 96 and a radial support member 204, positioned circumscribing the PDT 36. During thermal growth of the PDT 36, the expansion joint 202 expands in an axial direction as indicated by arrows 206 allowing for the outer cup 94 of the air valve 96 to move axially and allow thermal growth of the PDT 36. The radial support member 204 provides a means to maintain concentric alignment of the PDT 36 relative to the PDC casing 50 during thermal expansion of the PDT 36. By incorporating a thermal expansion control joint 90 for each pulse detonation combustor, and more particularly each pulse detonation tube and nozzle assembly, 200 each individual PDTs 36 is configured to expand independently of the other PDTs 36.

Referring now to FIG. 7, illustrated in a cross-sectional view is a pulse detonation combustor, and more particularly a pulse detonation tube and nozzle assembly, 300 including a thermal expansion control joint configured to enable the pulse detonation tube 36 to thermally expand during operation. As previously discussed, the PDT 36 may be coupled to the nozzle 40 using a variety of techniques. As illustrated, the PDT 36 and nozzle 40 are attached via a welded joint 82. As previously described with regard to FIGS. 4, 5 and 6, the detonation process generates heat that may induce significant thermal expansion of the PDTs 36. In this particular embodiment, the nozzle exit orifice 42 is secured to the inner frame member 62 by the inner flange segment 44, which is sandwiched between the inner frame member 62 and the inner support member 84. Similarly, the outer flange segment 46 is sandwiched between the outer frame member 64 and the outer support member 86, thereby securing the nozzle exit orifice 42 to the outer frame member 64. In this particular embodiment, the nozzle exit orifice 42, while described as being secured to the inner frame member 62 and the outer frame member 62, may be secured in a manner including some degree of flexibility between the nozzle 40 and the frame members 62, 64 to accommodate thermal growth of the PDT 36. Irrespective of securement means, the position of the nozzle exit orifice 42 is fixed with respect to the turbine 18, thus maintaining the orientation of exhaust flow into the turbine 18 despite thermal growth of the nozzle 42 and/or the PDT 36. In this exemplary embodiment, the PDC casing 50 is coupled to the structural member 68 and includes at least one thermal expansion control joint 90 to facilitate thermal expansion, or growth, of the PDT 36 while maintaining a position of the tube head end 92 with respect to the casing 50. In the embodiment illustrated in FIG. 7, the thermal expansion control joint 90 is configured as a sliding expansion joint 302, whereby an upper end portion 304 of the PDT tube 36 is configured to slide within a radial support member 306, to accommodate thermal growth of the PDT 36. To accommodate the sliding expansion joint 302, the radial support member 306, is positioned circumscribing the PDT 36. The radial support member 306 has formed integrally therein a sliding space 308, allowing movement therein of the PDT 36. The PDC casing 50 may further include at least one expansion control joint 90, in the form of expansion joints 310 formed in the outer casing 50. During thermal growth of the PDT 36, the PDT tube 36 slides in an axial direction as indicated by arrows 312 within the sliding expansion joint 302. In addition, the outer casing 50 may expand in an axially direction at the at least one expansion control joint 310, allowing for the PDT 36 to move axially and allow for thermal growth of the PDT 36. The radial support member 306 provides a means to maintain concentric alignment of the PDT 36 relative to the PDC casing 50 during thermal expansion of the PDT 36. By incorporating a thermal expansion control joint 90 for each pulse detonation combustor, and more particularly each pulse detonation tube and nozzle assembly, 300 each individual PDTs 36 is configured to expand independently of the other PDTs 36. The tube end 304 has provisions for a sliding seal such as a piston ring, an o-ring, a graphoil rope seal or a raised bump (or series of raised bumps) similar to labyrinth seals.

As best illustrated in FIG. 7, the pulse detonation combustor, and more particularly pulse detonation tube and nozzle assembly, 300 may include an inter-nozzle cooling configuration. As previously described, the pulse detonation process generates high temperature exhaust products 54 that pass through the nozzle exit orifices 42, thereby exposing the nozzles 40 to high thermal loads. Consequently, the present embodiment includes a system configured to provide cooling to the individual nozzles 40. A cooling manifold, such as the illustrated circumferential cooling manifold 320, is formed proximate the nozzle 40. The circumferential cooling manifold 320 extends axially and circumferentially about the nozzle 40 and provides impingement cooling to the nozzle 40. One or more cooling slots, such as the illustrated axial cooling slots 322, are formed proximate the nozzle 40 and provide cooling thereto. As will be appreciated, alternative embodiments may include cooling slots angled with respect to the axial direction. In operation, cooling air, from the compressor 22 or an alternate air source (e.g., external compressor, air blower, etc.) may be introduced to the circumferential cooling manifold 320, and more particularly through the axial cooling slots 322, and then axially along the nozzle 40. The airflow may serve to absorb heat from the inter-nozzle area, thereby cooling the nozzle 40.

In operation, cooling air enters the circumferential cooling manifold 320 and flows through the axially cooling slots 322. The cooling air impinges upon an outer circumferential surface 41 of the nozzle 40. As the cooling air flows along the outer circumferential surface 41 in the axial direction, heat from the exhaust products is absorbed by the air, thereby cooling the nozzle 40. Like the inter-nozzle cooling configuration may employ certain structures to enhance heat transfer between the cooling air and the outer circumferential surface 41, such as fins, vanes, or baffles. Further embodiments may utilize a cooling medium other than air, such as water, nitrogen, or carbon dioxide.

Although the present embodiment discloses specific pulse detonation tube and nozzle assembly embodiments, the disclosure is not limited to such designs. Alternative configurations of the pulse detonation tube and nozzle assembly may employ pulse detonation tube and nozzle configurations that provide for thermal growth of the pulse detonation tube in a similar manner. It will be appreciated that the orientation and configuration of the components employed are a function of the design and operational requirements of the particular application. Those of ordinary skill in the art are capable of determining and implementing the optimal configuration, taking into account the necessary parameters and design criteria.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A pulse detonation combustor, comprising:
    a plurality of nozzles configured to support a gas discharge annulus in a circumferential direction;
    a plurality of pulse detonation tubes extending to the plurality of nozzles; and
    a plurality of thermal expansion control joints configured to facilitate independent thermal growth of each pulse detonation tube,
    wherein each of the plurality of thermal expansion control joints is formed integral with a pulse detonation combustor casing circumscribing the pulse detonation tube and provides for axial expansion of the pulse detonation casing, and
    wherein the pulse detonation tube further includes at least one alignment fm on an exterior surface providing concentric alignment of the pulse detonation tube relative to the pulse detonation combustor casing.

2. The pulse detonation combustor of claim 1, wherein the plurality of nozzles are engaged with one another via mating surfaces.

3. The pulse detonation combustor of claim 1, wherein the plurality of nozzles are configured as a monolithic structure.

4. The pulse detonation combustor of claim 1, wherein each pulse detonation tube extends to a respective nozzle.

5. The pulse detonation combustor of claim 1, wherein each of the plurality of thermal expansion control joints is configured as a bellows expansion joint.

6. The pulse detonation combustor of claim 5, wherein the bellows expansion joint is formed integral with the pulse detonation combustor casing circumscribing the pulse detonation tube and provides for axial expansion of the pulse detonation casing.

7. The pulse detonation combustor of claim 1, wherein the at least one alignment fm is configured as a ring circumscribing the pulse detonation tube.

8. The pulse detonation combustor of claim 1, wherein the at least one alignment fm is configured as a discrete pin protruding from an outer surface of the pulse detonation tube.

9. The pulse detonation combustor of claim 1, wherein each of the plurality of thermal expansion control joints is configured as a sliding expansion joint.

10. The pulse detonation combustor of claim 9, wherein the sliding expansion joint is configured to include at least one of a piston ring, a graphoil rope, an o-ring, a labyrinth seal and a c-seal.

11. The pulse detonation combustor of claim 9, wherein the sliding expansion joint is configured to provide axial movement of an outer cup of an air valve positioned at an uppermost end portion of each pulse detonation tube.

12. The pulse detonation combustor of claim 9, wherein the sliding expansion joint is configured to provide axial movement of the pulse detonation tube relative to a radial support member fixed radially about the pulse detonation tube.

13. The pulse detonation combustor of claim 1, wherein each nozzle is oriented substantially tangent to the gas discharge annulus.

14. The pulse detonation combustor of claim 1, wherein each nozzle is oriented at an angle relative to a pulse detonation combustor longitudinal centerline corresponding to a turbine entrance angle.

15. The pulse detonation combustor of claim 1, further comprising a plurality of cooling manifolds each having one or more axial cooling slots in fluid communication with each of the plurality of nozzles.

16. A pulse detonation combustor, comprising:
    a plurality of nozzles each having a nozzle exit orifice and a nozzle inlet, wherein the plurality of nozzle exit orifices are configured to form a gas discharge annulus;
    a plurality of pulse detonation tubes each coupled to a respective nozzle inlet; and a plurality of thermal expansion control joints configured to facilitate independent thermal growth of each pulse detonation tube, wherein each of the plurality of thermal expansion control joints is configured integral with a pulse detonation combustor casing circumscribing the pulse detonation tube and provides for axial expansion of the pulse detonation casing, and wherein the pulse detonation tube further includes at least one alignment fm on an exterior surface providing alignment of the pulse detonation tube relative to the pulse detonation combustor casing.

17. The pulse detonation combustor of claim 16, wherein the plurality of nozzle exit orifices are engaged with one another via mating surfaces to form the gas discharge annulus.

18. The pulse detonation combustor of claim 16, wherein each pulse detonation tube is coupled to the respective nozzle inlet by a welded connection.

19. The pulse detonation combustor of claim 16, wherein each nozzle converges in a cross-sectional area perpendicular to a direction of gas flow through the nozzle from the nozzle inlet to the nozzle exit orifice.

20. The pulse detonation combustor of claim 16, wherein each of the plurality of thermal expansion control joints is configured as a bellows expansion joint.

21. The pulse detonation combustor of claim 20, wherein the bellows expansion joint is formed integral with the pulse detonation combustor casing circumscribing the pulse detonation tube and provides for axial expansion of the pulse detonation casing.

22. The pulse detonation combustor of claim 16, wherein the at least one alignment fm is configured as at least one of a ring circumscribing the pulse detonation tube or a discrete pin protruding from an outer surface of the pulse detonation tube.

23. The pulse detonation combustor of claim 16, wherein each of the plurality of thermal expansion control joints is configured as a sliding expansion joint.

24. The pulse detonation combustor of claim 23, wherein the sliding expansion joint is configured to provide axial movement of an outer cup of an air valve positioned at an uppermost end portion of each pulse detonation tube.

25. The pulse detonation combustor of claim 23, wherein the sliding expansion joint is configured to facilitate axial movement of the pulse detonation tube relative to a radial support member fixed radially about the pulse detonation tube.

26. The pulse detonation combustor of claim 16, further comprising a plurality of cooling manifolds each having one or more cooling slots in fluid communication with the plurality of nozzles.

27. The pulse detonation combustor of claim 26, wherein each of the cooling manifolds is disposed adjacent to an outer circumferential surface of the nozzle, and the cooling slots are configured to cool the outer circumferential surface of nozzle.

* * * * *